July 9, 1968     I. GULBIS     3,392,329
MAGNETIC MEMORY CORE TESTER WITH FIXED
VERTICALLY ORIENTED PROBE
Filed Oct. 18, 1965     2 Sheets-Sheet 1
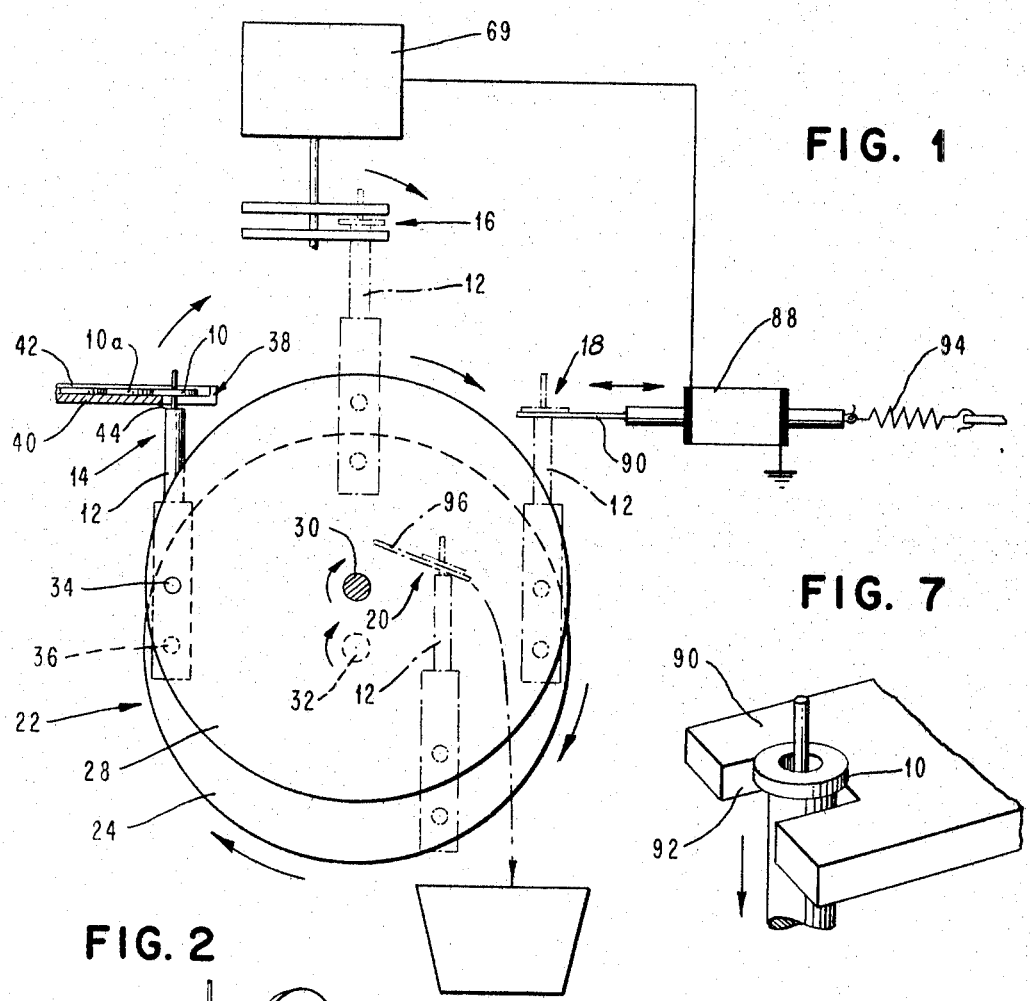
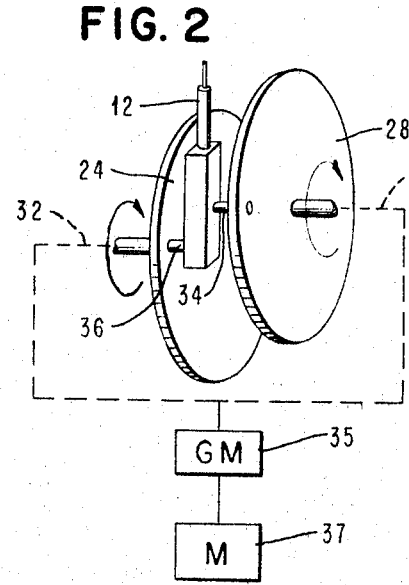
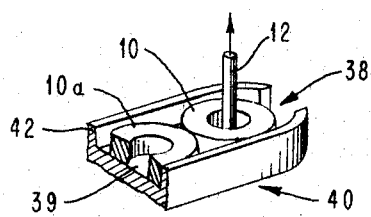
INVENTOR
IMANTS GULBIS
BY James E. Murray
ATTORNEY July 9, 1968

I. GULBIS 3,392,329

MAGNETIC MEMORY CORE TESTER WITH FIXED
VERTICALLY ORIENTED PROBE

Filed Oct. 18, 1965

United States Patent Office 3,392,329
Patented July 9, 1968

3,392,329
MAGNETIC MEMORY CORE TESTER WITH FIXED VERTICALLY ORIENTED PROBE
Imants Gulbis, Beacon, N.Y., assignor to International Business Machines Corporation, Armonk, N.Y., a corporation of New York
Filed Oct. 18, 1965, Ser. No. 496,823
3 Claims. (Cl. 324—34)

ABSTRACT OF THE DISCLOSURE

This specification describes a memory core tester with an improved core carrying probe wheel and electrical testing contacts. The probe wheel consists of two spaced discs rotating at the same speed in parallel planes around misaligned axes. The probe is positioned between the two discs and is pivotly attached to each of the discs at two different points so that the probe maintains a fixed vertical orientation as the discs rotate. The fixed vertical orientation of the probe minimizes movement of the core relative to the probe. The electrical testing contacts are independently mounted on separate arms which are each pivoted around an axis that is parallel to the probe and perpendicular to the direction in which the probe is moving as it passes through the contacts. By so mounting the contacts, any moments or forces exerted on the contacts by the probe are around the axes on which the contacts pivot so as to minimize deflection and bending of the contacts.

---

The present invention relates to the testing of magnetic cores and more particularly to apparatus which performs such testing.

In order that the magnetic cores in memories have uniform characteristics, it is necessary that each core be put through an electrical test. Because of the small size of the cores and the number of cores involved, it has been the practice to test the cores automatically. One type of automatic core tester includes a probe mounted on a wheel. As the wheel moves, the probe moves with the wheel successively through a pick-up station where it picks up a core, a testing station where the probe is contacted by electrical contacts to test the core, and core removal stations where the core being tested is removed from the probe.

While this type of automatic tester has been used extensively, it is not completely satisfactory for testing cores. One of its drawbacks is the inability to repeat the same testing conditions for each core being tested. This is due in part to improper engagement of the probe by the electrical contacts at the core testing station. As the probe carrying a core moves into the core testing stations, one set of contacts contacts the probe on the top of the core and the other set of contacts contacts the probe below the core so that core drive current can be transmitted through the probe to the core and the response to the core to the drive current can be sensed in the probe. It is quite important that the probe be contacted by the contacts in the same manner and at the same spots each time. This is because the electrical resistance of the paths for driving the core and sensing its response depend on the conditions in which the probe is contacted, and if the resistance of the paths changes from core to core, the test conditions will not be repeatable and will give erroneous test results.

Another problem with the above-described automatic tester is that it can damage the cores. Damage to the cores can result from movement of the cores on the probe as the probe changes its orientation when it moves, and also from the force exerted on the cores by the probe as the probe picks up the cores for testing and drops the cores after the completion of testing.

Therefore, it is an object of the present invention to provide core testing apparatus wherein the test conditions are repeatable from core to core.

Another object of the invention is to provide contacts which contact the probe in substantially the same position for one core after the other.

Further objects of the invention are: to increase the number of cores that can be tested in a specified period; to reduce contact bounce; to minimize damage to the cores while they are being tested; to provide new contacts for core handling; to reduce probe wear and damage; to minimize jamming of the core testing apparatus; and to provide contacts with independent force and deflection adjustments.

One aspect of the present invention is the provision of new contacts for core testing. These contacts are independently mounted on separate arms which are each pivoted around an axis that is parallel to the probe and perpendicular to the direction in which the probe is moving as it passes through the contacts. By so mounting the contacts, any moments or forces exerted on the contacts by the probe are around the axes on which the contacts pivot so as to minimize deflection and bending of the contacts. With deflection and bending of the contacts minimized, the contacts will tend to contact the probe at the same spots and thus tend to maintain the resistance in the driving and sensing paths through the probe constant.

Another aspect of the present invention is the addition of means for maintaining the probe at a constant orientation during the core testing cycle. By maintaining the probe at a constant orientation, bouncing of the cores on the probe is minimized. Furthermore, constant probe orientation provides optimum probe pick-up, testing and drop configurations.

The foregoing and other objects, features and advantages of the invention will be apparent from the following more particular description of a preferred embodiment of the invention, as illustrated in the accompanying drawings of which:

FIG. 1 is a plan view of a preferred embodiment of the present invention.

FIG. 2 is an illustration of the probe and probe wheel for the embodiment shown in FIG. 1.

FIG. 3 is an illustration of a core pick-up station for the embodiment shown in FIG. 1.

FIG. 7 is an illustration of a core removal station of the embodiment shown in FIG. 1.

Figure 4:
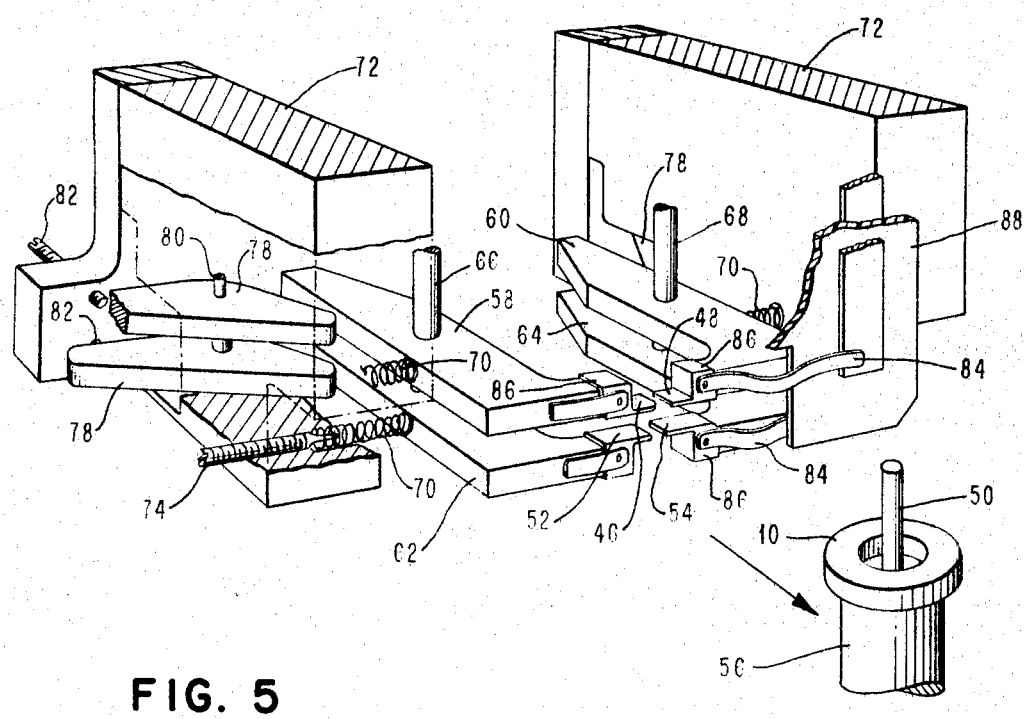
FIG. 4 is an illustration of the contacts for the embodiment shown in FIG. 1.

Referring now to FIGS. 1 and 2, a core 10 is picked up by a vertical probe 12 at a pick-up station 14, carried through a testing station 16, and is thereafter removed from the probe 12 at either a good core removal station 18 or a bad core removal station 20. The probe is mounted on wheel means 22 which includes two spaced rotating discs 24 and 28 which are mounted for rotation in parallel vertical planes on separate misaligned horizontal axes 30 and 32. The single probe 12 is positioned between discs 24 and 28 and is pivotly mounted at one point on each of the discs at separate points 34 and 36 along its axes. The discs 24 and 28 are rotated in synchronism with a stop motion by an electric motor 35 through a Geneva type movement 37. As the discs rotate, they move the tip of the probe through the pick-up, testing, and core removal stations while maintaining the probe 12 in a vertical orientation at all times.

In FIG. 1, the orientation of the probe in each of the stations 12 to 20 is illustrated.

As shown in FIG. 3, as the probe moves around the wheel and through the pickup station 10, it passes through a slot 38 in a loading platform 40. The cores are positioned in a channel 39 in the loading platform 40 defined by a lip 42 extending around the loading platform. At the end of the channel, the slot 38 extends through the bottom of the loading platform 40 and the lip 42. The core 10 to be tested is positioned with its edge against the side of the lip 42 and its aperture over the slot 38. As the probe moves, it passes vertically up through the slot 38 so that its tip passes through the aperture in the core 10. As the probe continues to move, the core 10 comes in contact with the shoulder 44 of the probe 12. The shoulder 44 of the probe is broader than the aperture in the core. Therefore, the core rests on the shoulder and is lifted off the platform 40 and over the lip 42 by the probe. The lifting of the core by the probe which is moving axially to the core puts very little stress on the core and thus causes no damage to the core.

Once the core 10 is removed from the pick-up station the core 10a is advanced along the channel 39 into position over the slot 38 where it will be picked up the next time the probe passes through the pick-up station. The means for advancing cores along the channel is not shown because it does not constitute part of the present invention. However, it could be a syntron bowl feeder employed as it is commonly used in the prior art.

With the core resting on the shoulder 44, the probe 14 moves from the pick-up station 12 to the testing station 16 maintaining a fixed orientation as it moves. By maintaining a fixed orientation of the probe, the core is kept relatively still on the probe and does not bounce around or shift its position, thus eliminating the possibility of damage to the core during transportation.

When the core arrives at the testing station 16, it is engaged by four contacts as it moves horizontally through the contacts. Contacts 46 and 48 engage the probe 12 above the core 10 in its narrower portion 50 while contacts 52 and 54 engage the probe 12 in its larger portion 56 below the core. As shown in FIG. 4, the contacts 46, 48, 52 and 54 are mounted on separate pivot arms 58, 60, 62, and 64. Each pivot arm is free to rotate in a horizontal plane around an axis which is parallel to the probe and perpendicular to the direction of motion of the probe as it engages the contacts. Pivot arms 58 and 62 are rotatably mounted on vertical shaft 66 which is parallel to the probe 12 and perpendicular to the direction in which the probe is moving, and pivot arms 60 and 64 are rotatably mounted on a vertical shaft 68 which is parallel to the probe 12 and perpendicular to the direction in which the probe is moving. As the probe contacts the contacts 46, 48, 52 and 54 it causes the pivot arms to pivot around the shafts 66 and 68 so as to allow the probe to pass between the contacts. Since the shafts 66 and 68 are parallel to the probe and perpendicular to the direction of motion of the probe, all the forces exerted on the contacts by the probe are exerted around the shafts in a plane perpendicular to the shafts. Thus, there is no movement of the arms except in the plane in which the arms are free to rotate. Furthermore, these forces are in a plane which is parallel to the velocity vector of the probe 12 at the moment the probe engages the contacts.

Figure 5:
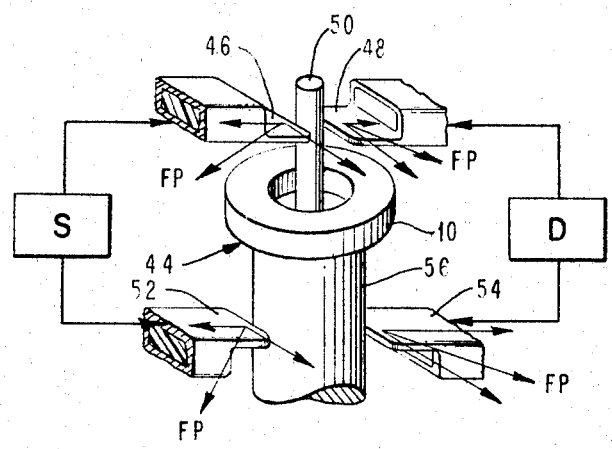
FIG. 5 is an illustration showing how electrical contact is made through the probe by the contacts shown in FIG. 3.
Figure 6:
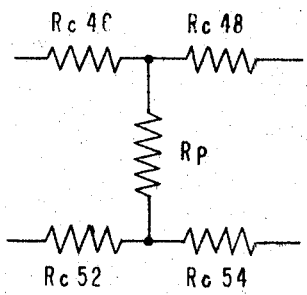
FIG. 6 is a graphic representation of the resistance through the probe and contacts.

When the probe contacts the four contacts, its movement stops. This is because the discs 24 and 28 are driven through a Geneva-type drive to provide a stop motion. Once the probe has stopped moving, tests are run on the core 10, by testing equipment 69. During these tests, drive current is passed through the probe 12 between the contacts 48 and 54 and the response of the core to the drive current is sensed across contacts 46 and 52. The probe 12 is a non-magnetic conductor, and the paths for the core drive and sensing circuits through the probe 12 and contacts 46, 48, 52 and 54 are illustrated in FIG. 5. As can be seen, the impedance of the core drive and sensing circuits depends on the contact resistances of contacts 46, 48, 52 and 54, and the resistance $R_p$ of the portion of the probe 12 forming part of the path for the driving and sensing signals. It is very important that these resistances remain constant particularly the resistance $R_p$ due to current flowing through the probe. This is because the resistance $R_p$ due to the current flowing through the probe is common to both the drive and sense circuits and therefore carries both the drive and sense currents. Since the drive current is much larger than the sense current, it is difficult to measure the sense current unless it is known what portion of the signal being measured is due to the drive current. This is easily determinable if the resistance $R_p$ remains constant. However, if the resistance $R_p$ varies from core to core being tested, it becomes difficult to determine what portion of the signal being measured is attributable to the response of the core and what portion is caused by the drive current. Therefore, erroneous core testing results are possible. By the use of contacts mounted on arms pivoted as previously described, it is possible to maintain the resistance $R_p$ constant. This is because all the force exerted by the probe 12 on the contacts 46, 48, 52 and 54 is exerted in a plane in which the contacts are free to rotate. This means that there will be no bending or deflection of the contacts. Bending and deflection of the contacts can cause a change in the length of the path of the drive and/or sense signal through the probe 12 and thereby cause a change in the resistance $R_p$. Therefore by eliminating binding or deflection of the contacts more accurate test results are provided.

To adjust the force each contact exerts on the probe a spring 70 is connected between each of the pivot arms and the frame 72. The amount of force each spring 70 exerts can be changed by adjusting a set screw 74 which is threaded through the frame 72 and at one end supports the end of the spring adjacent to the frame 72. Spacing between each contact is determined by an adjustable stop 78. The stops oppose the force exerted on the pivot arms by the springs so as to limit the extent in which the contacts can approach each other. Each stop 78 is rotatable about a pivot point 80 by a set screw 82 which is threaded through the frame 72 and presses up against the stop 78. By adjustment of the mentioned set screws, the contact face and spacing for each of the contacts can be set independently of each other. This allows quick optimization of the spacing and force parameters of the contacts. Furthermore, it permits adjustment of the spacing and force exerted by the contacts to accommodate different sizes of probes thereby allowing a number of different-sized cores to be tested with the basic testing equipment by merely changing the probe. Electrical signals to and from the contacts are made by flexible electrical conductors 84 connected between conductive portions 86 of the arm and a printed circuit 88 attached to the frame 72.

Once the core 10 has been tested, the probe 12 travels from the testing station to the good core removal station remaining in its upright position as it moves. If the core 10 has tested good, electrical signal is transmitted by the testing equipment 69 at the testing station to the good core removal station to actuate a solenoid 88. The solenoid 88 then advances an arm 90 to a position where the probe 12 passes through a groove 92 in the arm 90. This groove 92 is sufficiently wide to allow the wide portion of the probe to pass through it but is narrow enough so that its edges stop the core 10, which is wider than the probe, as the probe backs through the groove. Therefore, the core is gently lifted off the probe 12 by the arm 90 without the aid of air jets. If the core 10 tests bad no signal is transmitted by the testing equipment 69 at the core testing station to the good core removal station and the arm is retained in a retracted position by the spring 94 so that the core does not pass through the groove 92. In this case the core 10 remains in the probe as it passes through the good core removal station on the probe.

After the probe 12 passes the good core removal station it passes through the bad core removal station. The bad core removal station has a stationary arm 96. This arm 96 is similar to the movable arm 90 at the good core removal station. However, at all times arm 96 remains stationary so that the probe 12 has to pass through the slot in the arm 96 once each revolution. This is to remove any cores that remain on the probe after the probe passes through the good core removal station so that when the probe comes around and returns to the core loading station 14 it will be ready to receive a new core 10a to be tested.

One embodiment of the invention has been described and a number of advantages of the invention have been mentioned. Other advantages of the present invention include the minimization of contact bounce, contact wear, and probe breakage and jamming. These advantages result in reductions in down time and therefore permit more rapid core testing.

While the invention has been particularly shown and described with reference to one preferred embodiment thereof, it will be understood by those skilled in the art that the foregoing and other changes in form and details may be made therein without departing from the spirit and scope of the invention.

I claim:

1. In a magnetic core testing device having a moving electrically conductive probe for carrying a magnetic core to be tested and having spaced contacts positioned to be engaged by said probe as it moves through the spaced contacts to thereby complete electrical circuits for driving said core and sensing the response of said core, improvement which comprises:
   (a) said contacts being mounted on separate arms, each pivoted for rotation around an axis which is substantially perpendicular to the direction in which the probe is moved as it engages the contacts;
   (b) separate spring means which can be adjusted to exert a selected force on each of said pivot arms around its axis of rotation independently of the force exerted on the other pivot arms; and
   (c) adjustable stop means for individually limiting the movement of each arm around its axis of rotation in the direction of the force being exerted on the pivot arms by said spring means whereby the spring and stop means of each of the arms can be changed independently of each other to thereby limit contact bounce.

2. In a magnetic core testing device having a core pick-up station, a core magnetic characteristic testing station, a good core removal station, a bad core removal station and an electrically conductive vertical probe for carrying a core to be tested through at least the three first mentioned stations, the improvement which comprises wheel means coupled to said probe for moving said probe in an orbital path around said wheel means through the pickup, testing and core removal stations at a substantially fixed vertical orientation.

3. In a magnetic core testing device having a core pick-up station, a core magnetic characteristic testing station, a good core removal station, a bad core removal station and an electrically conductive vertical probe for carrying a core to be tested through at least the three first mentioned stations, the improvement which comprises wheel means for moving said probe through the pickup, testing and core removal stations at a substantially fixed vertical orientation, said wheel means having two spaced discs rotating at the same speed in parallel planes around misaligned axes and said probe being positioned between the two discs and pivotly attached to each of the discs at two different points along the axis of the probe.

References Cited
UNITED STATES PATENTS

| 2,796,986 | 6/1957 | Rajchman et al. | 324—34 |
| 3,175,153 | 3/1965 | Paessler | 324—158 |
| 3,209,908 | 10/1965 | Hopkins | 209—81 |

RUDOLPH V. ROLINEC, *Primary Examiner.*

R. J. CORCORAN, *Assistant Examiner.*